(12) United States Patent
Nunes Espirito Santo

(10) Patent No.: US 11,518,659 B2
(45) Date of Patent: Dec. 6, 2022

(54) SYSTEM FOR CONTROLLING A FORKLIFT TRUCK HAVING SEVERAL MODES OF OPERATION

(71) Applicant: COMPAGNIE GENERALE DES ETABLISSEMENTS MICHELIN, Clermont-Ferrand (FR)

(72) Inventor: Ruben Andre Nunes Espirito Santo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 216 days.

(21) Appl. No.: 16/626,022

(22) PCT Filed: Jun. 28, 2018

(86) PCT No.: PCT/FR2018/051601
§ 371 (c)(1),
(2) Date: Dec. 23, 2019

(87) PCT Pub. No.: WO2019/002784
PCT Pub. Date: Jan. 3, 2019

(65) Prior Publication Data
US 2020/0122989 A1    Apr. 23, 2020

(30) Foreign Application Priority Data

Jun. 29, 2017 (FR) ...................................... 1755996

(51) Int. Cl.
*B66F 9/06* (2006.01)
*B66F 9/075* (2006.01)
(Continued)

(52) U.S. Cl.
CPC ............ *B66F 9/063* (2013.01); *B66F 9/0755* (2013.01); *B66F 9/0759* (2013.01); *B66F 9/24* (2013.01);
(Continued)

(58) Field of Classification Search
CPC ...... B66F 9/063; B66F 9/0755; B66F 9/0759; B66F 9/24; B66F 17/003; G05D 1/0238; G05D 2201/0216
See application file for complete search history.

(56) References Cited

U.S. PATENT DOCUMENTS

| 4,077,486 A | 3/1978 | Blakeslee et al. |
| 5,257,177 A | 10/1993 | Bach et al. |

(Continued)

FOREIGN PATENT DOCUMENTS

| EP | 1 138 868 A1 | 10/2001 |
| EP | 2495145 A | 9/2012 |

(Continued)

OTHER PUBLICATIONS

International Search Report dated Oct. 11, 2018, in corresponding PCT/FR2018/051601 (8 pages).

(Continued)

*Primary Examiner* — Tyler J Lee
*Assistant Examiner* — Yufeng Zhang
(74) *Attorney, Agent, or Firm* — Venable LLP

(57) ABSTRACT

A system for controlling a forklift truck has several operating modes and allows, in particular, operation in manual mode or autonomous mode. A forklift truck is provided with such a control system.

11 Claims, 1 Drawing Sheet

(51) Int. Cl.
*B66F 9/24* (2006.01)
*B66F 17/00* (2006.01)
*G05D 1/02* (2020.01)

(52) U.S. Cl.
CPC ......... *B66F 17/003* (2013.01); *G05D 1/0238* (2013.01); *G05D 2201/0216* (2013.01)

(56) References Cited

U.S. PATENT DOCUMENTS

| | | |
|---|---|---|
| 5,469,356 A | 11/1995 | Hawkins et al. |
| 5,890,545 A * | 4/1999 | Smith ............... A01B 51/026 172/200 |
| 8,694,194 B2 | 4/2014 | Waltz et al. |
| 9,002,626 B2 | 4/2015 | Waltz et al. |
| 9,399,472 B2 | 7/2016 | Minoiu-Enache |
| 2004/0024504 A1 | 2/2004 | Salib et al. |
| 2012/0226420 A1 | 9/2012 | Bauer et al. |
| 2013/0054076 A1 | 2/2013 | Waltz et al. |
| 2014/0032017 A1 | 1/2014 | Anderson et al. |
| 2014/0188324 A1 | 7/2014 | Waltz et al. |
| 2014/0240117 A1 | 8/2014 | McKernan et al. |
| 2015/0134178 A1 | 5/2015 | Minoiu-Enache |
| 2016/0090283 A1 * | 3/2016 | Svensson ............. H04N 13/204 701/50 |
| 2016/0264387 A1 | 9/2016 | Yoon et al. |
| 2018/0356817 A1 * | 12/2018 | Poeppel ................ G05D 1/0061 |
| 2020/0133265 A1 | 4/2020 | Modolo |

FOREIGN PATENT DOCUMENTS

| | | |
|---|---|---|
| EP | 3 061 719 A1 | 8/2016 |
| FR | 2 667 367 A1 | 4/1992 |
| JP | 2000-185534 A | 7/2000 |
| JP | 2001-226095 A | 8/2001 |
| WO | 2013/033179 A1 | 3/2013 |
| WO | 2013/150244 A1 | 10/2013 |

OTHER PUBLICATIONS

T. Samakwong, et al., "PID Controller Design for Electro-hydraulic Servo Valve System with Genetic Algorithm", Procedia Computer Science 86 (2016) 91-94.

* cited by examiner

SYSTEM FOR CONTROLLING A FORKLIFT TRUCK HAVING SEVERAL MODES OF OPERATION

FIELD OF THE INVENTION

The invention relates to a control system for a forklift truck having several operating modes. More specifically, the invention relates to a control system for a forklift truck normally intended to operate in manual mode.

A manual lift truck is designed to be driven by a forklift truck operator with a special licence. Driving and operating such a vehicle and its various accessories requires specific training. The driver thus learns to operate the vehicle, use the forks to transport equipment, and comply with all of the safety rules relevant to the environment in which he operates.

To avoid these constraints, fully autonomous lift trucks have appeared on the market. These trucks, intended for transporting goods entirely autonomously, are relatively costly, and only provide the option of use in autonomous mode, which can be restrictive for certain uses.

WO2013/150244 also discloses vehicles usually intended to operate in manual mode that are adapted in order to allow a second automatic operating mode. It thus becomes possible to perform a number of services such as a valet service, a parking service, etc. However, this document only relates to passenger vehicles, and does not take into account the specific features of a forklift truck, and an operating environment such as a factory.

The present invention therefore aims to propose a control system for a forklift truck that makes it possible to overcome the aforementioned drawbacks. By way of preamble, it is hereby specified that the terms "truck", "lift truck" and "forklift truck" will be used indiscriminately in this document, with the same meaning.

SUMMARY OF THE INVENTION

The invention thus relates to a system for controlling a lift truck, including:
Human control members generating signals for manually handling actuators of the vehicle,
A module for detecting the vehicle environment,
A navigation module making it possible to generate handling set point signals as a function of an instruction received,
A control module generating handling signals, this control module comprising:
  An automatic control sub-module generating autonomous handling signals sent to one or more actuators of the vehicle, as a function of the set point signals and the information from the detection module,
  An assisted control sub-module generating manual handling signals corrected as a function of the manual handling signals and the information from the detection module and/or the handling set point signals,
A switching module arranged to select one or more manual handling signals and/or one or more autonomous handling signals, and/or one or more corrected manual handling signals.

The invention thus makes it possible to implement, in order to control a lift truck, different operating modes, from fully autonomous to fully manual, with assisted modes in between. These operating modes will be described below in relation to the detailed description of the switching module.

The invention also relates to a lift truck provided with a control system according to the invention. All of the features described below can therefore relate to the control system only, or the truck provided with the control system.

The human control members are advantageously those present on a lift truck available on the market. One embodiment of the invention therefore consists of adding the other elements of the control system to such an existing truck, together with the necessary interfaces, in order to convert a manual lift truck into an autonomous or semi-autonomous truck.

In a preferred embodiment, the switching module selects the handling signals as a function of four operating modes:
  A manual mode in which only the manual signals are selected,
  A fully automatic mode in which only the autonomous signals are selected,
  An assisted safety manual mode, in which the manual handling signals corrected by the information from the detection module are selected,
  An assisted navigation manual mode, in which the manual handling signals corrected by the handling set point signals are selected.

Advantageously, this switching module is actuated via a selector installed on the lift truck. A control system according to the invention thus makes it possible, even in the event that an operator wishes to drive the truck himself, to benefit from the equipment installed in order to automate the truck to provide driver assistance, and thus facilitate the operator's work and increase the safety of the truck's movements.

In a preferred embodiment, the switching module also makes it possible to choose a maintenance mode, in which all of the elements of the control system, with the exception of the human control members, are deactivated, in particular by a physical disconnection. This makes it possible, for example, for an original manufacturer of the manual lift truck to be able to perform maintenance actions, without being hindered by the additional elements of the control system.

In another preferred embodiment, the navigation module comprises one or more of the following elements:
  Geolocation means, making it possible to know the position of the lift truck in real time,
  Transmitting telecommunications means, making it possible for example to transmit the geolocation information to a general management system, so that a supervisor knows the position of different trucks in a factory at all times,
  Receiving telecommunications means, making it possible to receive set points relating to a route to follow, or actions to take such as for example an action of collecting equipment from a point A and then unloading it at a point B. On the basis of these received elements, the navigation module can then generate handling set point signals. These set point signals advantageously comprise one or more of the following set points: a speed set point, a truck wheel angle of rotation set point, a fork lifting set point, a fork angle set point, a fork spread set point.

As stated previously, the handling signals that will actually be transmitted to the actuators are determined as a function of these set point signals, determined by the navigation module, but also taking into account additional parameters from the detection module.

Thus, in a first embodiment, the environment detection module comprises a fork management sub-module, comprising:

Sensors for detecting the presence of a load on the forks,
Fork position sensors.

The handling signals will vary depending on the status of the forks (raised or lowered, full or empty). For example, a lift truck with loaded forks cannot travel at the same speed as an empty truck. Similarly, a lift truck with forks in the raised position cannot travel at the same speed or take the same angles as a truck with forks in the lowered position. These elements from the detection module thus make it possible to correct the set point signals to render them compatible with the safety requirements for the truck's environment.

In another embodiment, the fork management sub-module comprises means for detecting an inconsistency relating to the load on the forks, and for transmitting a stop signal in the event of any inconsistency. If the fork management sub-module detects that the objects loaded on the forks have fallen, or that these objects are off-centre, the movement of the truck must be stopped immediately, in order to avoid accidents. In this case, the stop signal is then transmitted to the control module so that it can generate corresponding handling signals, namely emergency stop handling signals.

In another embodiment, the environment detection module comprises a sub-module for detecting protection zones, comprising at least one laser making it possible to detect the presence of an obstacle in a zone surrounding the vehicle.

A lift truck operates in a restricted environment such as a factory or a storage warehouse, and it must therefore take into account different obstacles, physical or human, in order to avoid any collisions that might damage the equipment and endanger the operators working in the truck's environment. These elements then make it possible, as previously, to correct the set point signals to take the environment into account.

Similarly, the human control members are those generally installed on commercially available lift trucks, and in the group comprising: an accelerator pedal, a brake pedal, a steering wheel, a vehicle direction of travel selector, a lever for controlling the lifting, angle and spread of the forks.

Due to all of the elements of this control system, a lift truck according to the invention can travel over rough or uneven ground without any problems for the transport of pallets and reels, at speeds of up to 4 m/s. The presence of the safety systems, through the environment detection module, makes it possible to increase the speed without any risk for the surroundings of the truck, as it is known that in the event of a problem, the safety systems will come into operation. Such a truck therefore makes it possible to increase productivity while ensuring safety in the factory or warehouse, at a reasonable cost, as elements are added to an existing truck without making substantial modifications to the basic architecture of the truck.

Generally, all of the functions that have been described above in the form of modules can be physically split up differently and managed by shared or separate electronics.

BRIEF DESCRIPTION OF THE FIGURES

Further aims and advantages of the invention will become apparent from the following description of a preferred but non-limitative embodiment, illustrated by the following figures, in which.

DETAILED DESCRIPTION

Figure 1:
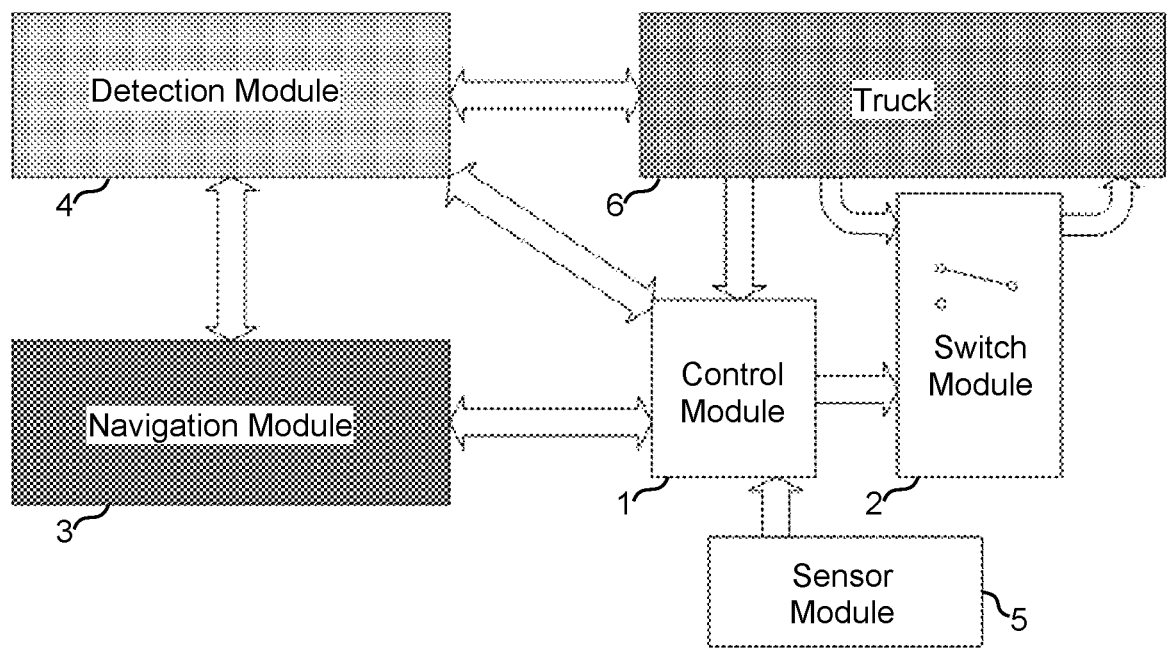
FIG. 1 shows a block diagram of a control system according to the invention.

FIG. 1 shows a control module 1 that comprises a set of electronic circuits making it possible to generate autonomous handling signals or corrected manual handling signals for a lift truck 6.

The handling signals generated in this way are transmitted to the switching module 2, which selects the signals to actually be transmitted to the actuators of the vehicle. This switching module will be described in detail with reference to FIG. 2.

The control module 1 receives as an input set point signals from the navigation module 3. These set point signals comprise in particular a speed signal and a steering angle signal for the truck that is transcribed into a steering wheel actuation signal. The set point signals also comprise signals for managing the forks, in particular the height, angle and spread of the forks.

The navigation module 3 comprises geolocation means, and also comprises a memory in which a map of the location in which the truck is intended to operate is stored, for example a factory or a warehouse. The map can be loaded directly into the memory from an external source, but it can also be established directly by the navigation module by learning when the truck first moves around a location to be mapped.

The navigation module additionally comprises means for receiving data from a remote server, for example by Wi-Fi. This received data corresponds to assignments to be performed by the truck, and comprises for example the identification of itineraries to be completed, or goods to be loaded and unloaded. To this end, the navigation module 3 also receives information from the detection module 4. This detection module makes it possible for example to inform the navigation module regarding the presence of obstacles in the truck's environment, or regarding the position of the forks.

This detection module 4 also communicates directly with the control module 1, for example to correct the handling set points as a function of external parameters that have not been taken into account by the navigation module, and that could jeopardise the safety of the truck or the operators.

The control module 1 also receives information from a set of sensors 5, for example sensors making it possible to detect an anomaly relating to the load. On receipt of this type of information, an emergency stop procedure of the truck can then be activated. This emergency procedure consists, for example, of acting in series on an emergency stop button originally present on the lift truck, which results in the power supply to the truck being cut off, and the stopping of the truck by releasing the pressure on the multi-disc brakes. Thus, the emergency procedure acts exactly as though an operator had pressed the emergency button.

Figure 2:
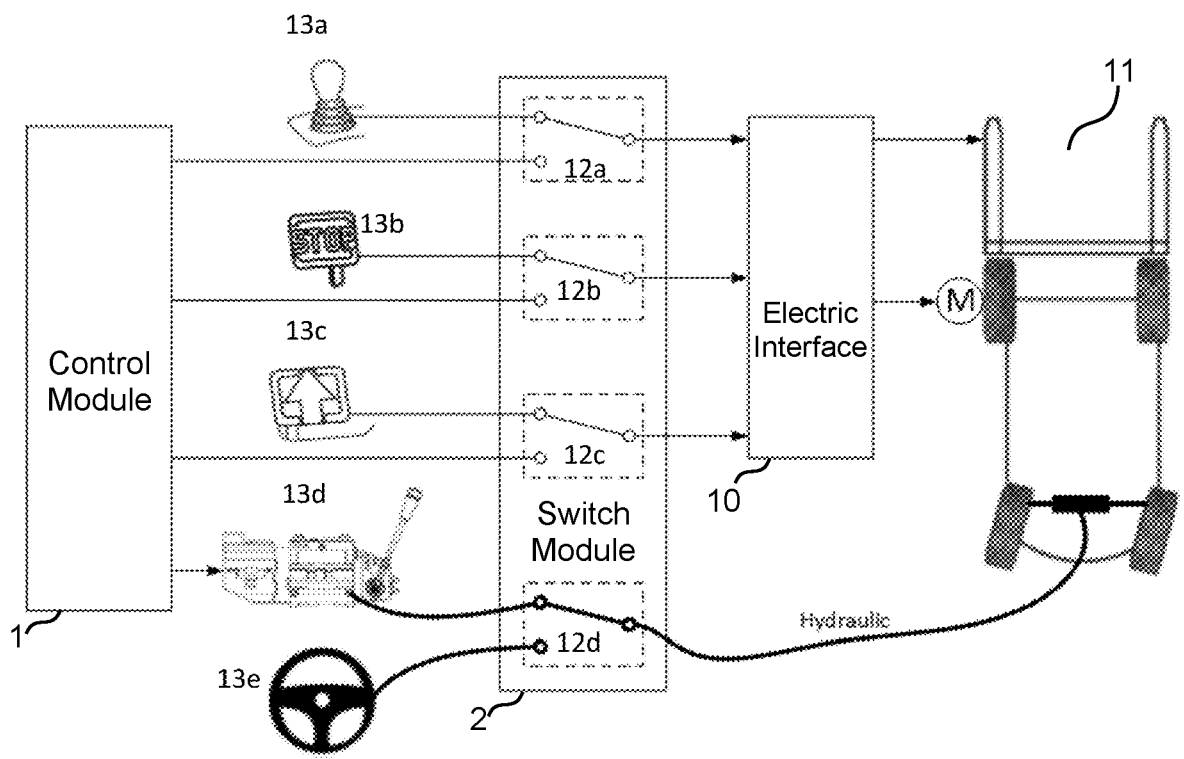
FIG. 2 gives details of the operation of the switching module of a system according to the invention.

The switching module will now be described in detail with reference to FIG. 2. This switching module is connected to the electric interface 10 of the truck 11. This interface is the one originally present on the truck 11, and it is connected to all of the actuators and sensors originally present on the truck.

The switching module is connected to a selector installed on the truck that makes it possible to choose the operating mode.

The switching module comprises a set of switches 12*a*, 12*b*, 12*c*, etc., that make it possible to switch between the signals coming directly from the human control members, and the signals from the control module 1.

A switch for the levers 13a of the truck can thus be seen, which makes it possible to choose the direction of travel of the truck, and also to handle the operation of the forks in manual mode.

A switch for the brake pedal 13b, one for the accelerator pedal 13c, and one for the steering wheel 13e can also be seen.

It will be noted in this figure that the steering wheel is a particular case, as the electric signals for handling the steering angle must be converted into hydraulic signals and transmitted directly to the truck 11 by a hydraulic connection. To this end, a control system according to the invention advantageously comprises a hydraulic valve enabling the conversion of the signals.

Depending on the operating mode chosen using a selector installed in the vehicle, one or more of these elements are activated or deactivated, as follows:
Switching module in manual mode:
Control module: deactivated
Navigation module: deactivated
Detection module: deactivated
Emergency stop procedure: activated
In this case, the switching module will select the signals coming directly from the human control members to transmit them to the electric interface 10. The switches will therefore be in the position shown in FIG. 2.
Switching module in assisted safety manual mode:
Control module: activated
Navigation module: deactivated
Detection module: activated
Emergency stop procedure: activated
In this case, the switching module will select the manual signals, corrected as a function of the information from the detection module. The switches will therefore be in the position shown in FIG. 2.
Switching module in assisted navigation manual mode:
Control module: activated
Navigation module: activated
Detection module: deactivated
Emergency stop procedure: activated
In this case, the switching module will select the manual signals, corrected as a function of the information from the navigation module. The switches will therefore be in the position shown in FIG. 2.
Fully autonomous mode:
Control module: activated
Navigation module: activated
Detection module: activated
Emergency stop procedure: activated
In this case, the switching module will select the autonomous signals from the control module 1.

On reading this description, it will be noted that a system according to the invention is very easy to install on an existing lift truck, as the additional modules interface easily with the existing electric and electronic architecture. Moreover, such a control system advantageously benefits from the sensors, buttons, selectors, etc. already present on the truck, further reducing the costs incurred by equipping existing trucks.

Generally, a system according to the invention makes it possible to convert a manual lift truck into an autonomous lift truck easily and at a reasonable cost, while complying with the safety requirements due to the specific environment in which such trucks operate.

The invention claimed is:

1. A system for controlling a lift truck vehicle, the system comprising:
human control devices generating manual handling signals for actuators of the vehicle;
a detection module for detecting a vehicle environment;
a navigation module generating handling set point signals as a function of an instruction received;
a control module generating handling signals, the control module comprising:
an automatic control sub-module generating autonomous handling signals sent to one or more actuators of the vehicle, as a function of the set point signals and information from the detection module;
an assisted control sub-module generating manual handling signals corrected as a function of the manual handling signals and the information received directly from the detection module and/or the handling set point signals; and
a switching module arranged to select one or more handling signals selected from the manual handling signals, the autonomous handling signals, the corrected manual handling signals and combinations thereof,
wherein the detection module, the navigation module, the control module and the switching module are installed on the lift truck vehicle.

2. The system according to claim 1, wherein the switching module selects the handling signals as a function of four operating modes:
a manual mode in which only the manual handling signals are selected;
a fully automatic mode in which only the autonomous handling signals are selected;
an assisted safety manual mode, in which the manual handling signals corrected by the information from the detection module are selected; and
an assisted navigation manual mode, in which the manual handling signals corrected by the handling set point signals are selected.

3. The system according to claim 1, wherein the switching module can select a maintenance mode, in which all of the elements of the control system, with the exception of the human control devices, are deactivated.

4. The system according to claim 1, wherein the navigation module comprises means of telecommunication with a remote computer.

5. The system according to claim 4, wherein the navigation module further comprises geolocation means.

6. The system according to claim 1, wherein the handling set point signals comprise a speed set point, a truck wheel angle of rotation set point, a fork lifting set point, a fork angle set point, and a fork spread set point.

7. The system according to claim 1, wherein the detection module comprises a fork management sub-module comprising:
sensors for detecting a presence of a load on forks; and
fork position sensors.

8. The system according to claim 7, wherein the fork management sub-module comprises means for detecting an inconsistency relating to the load on the forks and for transmitting a stop signal in the event of any inconsistency.

9. The system according to claim 1, wherein the detection module comprises a sub-module for detecting protection zones comprising:
at least one laser to detect a presence of an obstacle in a zone surrounding the vehicle.

10. The system according to claim 1, wherein the human control devices are selected from the group consisting of an accelerator pedal, a brake pedal, a steering wheel, a vehicle direction of travel selector, and a lever for controlling lifting, angle and spread of forks.

11. A lift truck vehicle comprising a control system according to claim 1.

\* \* \* \* \*